Patented Nov. 29, 1927.

1,650,689

UNITED STATES PATENT OFFICE.

DURAIN C. BUTTS, OF DOVER, NEW JERSEY, ASSIGNOR TO HERCULES POWDER COMPANY, OF WILMINGTON, DELAWARE, A CORPORATION OF DELAWARE.

METHOD OF REMOVING DIPHENYLAMINE FROM SMOKELESS POWDER.

No Drawing. Application filed July 30, 1926. Serial No. 126,095.

My invention relates to the removal of diphenylamine from smokeless powder.

Smokeless powder has heretofore been widely used in the manufacture of low viscosity lacquer, the powder being prepared for such use by first grinding the powder grains and then digesting in water at elevated temperatures, for example, those corresponding to steam at say between 20 pounds and 40 pounds pressure, for several hours. After digestion the powder is bleached to remove the yellow color formed in the digesting process, and dissolved in suitable nitrocellulose solvents.

It has been heretofore known that in order to permit of using the powder in lacquers, it is necessary to remove from the powder the diphenylamine incorporated therewith as a stabilizer, since the diphenylamine if left in powder exerts a detrimental effect on lacquer.

Numerous methods have heretofore been provided for removing the diphenylamine. For example, in one case the removal of the diphenylamine is effected by the use of ethyl alcohol and hydrochloric acid, and in another the removal is effected by a mixture of liquids, practically non-solvent of the powder, and an alkali.

Now in accordance with my invention I effect the removal of the diphenylamine from smokeless powder by the use of isopropyl alcohol, $CH_3CH(OH)CH_3$. More particularly I prefer to utilize isopropyl alcohol of a strength, for example, between 80% and 100% and I have discovered that the activity of the isopropyl alcohol for the purpose may be increased by the addition of a small quantity of benzene, say about 5%.

In carrying out my invention, for example, one part of smokeless powder to be treated, ground or unground, is treated with one and one-half parts of boiling isopropyl alcohol, preferably having a boiling point of 81.1° C. The powder is preferably given three successive treatments, first for one hour, then for one-half hour and third for two hours. After the treatments with boiling isopropyl alcohol, the powder is treated for about ten minutes with isopropyl alcohol at room temperature.

The smokeless powder is then digested with water to reduce the viscosity, bleached and finally dissolved in suitable solvent, as is customary.

Smokeless powder such as is customarily produced contains usually about 0.46% of diphenylamine, which by treatment in accordance with my invention may be reduced to about 0.015%.

If it be desired to increase the activity of the isopropyl alcohol such may be accomplished, as has been indicated, by the addition of about 5% of benzene to the isopropyl alcohol used for treating the powder.

The isopropyl alcohol, in removing the diphenylamine from the powder, acts to swell and penetrate the powder grains and to dissolve out the diphenylamine, but I have discovered that it acts to remove the diphenylamine with more rapidity and effect, without harm to the powder, than the substances heretofore used for the purpose.

It will be understood that in describing my invention herein in detail, I do not intend that my invention shall be limited thereby, as it will be understood that it consists essentially in the removal of diphenylamine from smokeless powder by the use of isopropyl alcohol.

Having now fully described my invention, what I claim and desire to protect by Letters Patent is:—

1. The method of removing diphenylamine from smokeless powder which includes treatment of the powder with boiling isopropyl alcohol.

2. The method of removing diphenylamine from smokeless powder which includes subjecting the powder to treatment with boiling isopropyl alcohol and then with isopropyl alcohol at a temperature below the boiling point.

3. The method of removing diphenylamine from smokeless powder which includes subjecting the powder to successive treatments with boiling isopropyl alcohol and then to a treatment with isopropyl alcohol at a temperature below the boiling point.

4. The method of removing diphenylamine from smokeless powder which includes subjecting the powder to a treatment with isopropyl alcohol having a boiling point of about 81.1° C. at a temperature not less than about 81.1° C. and then subjecting the powder to a treatment with isopropyl alcohol having a boiling point of about 81.1° C. at a temperature substantially less than 81.1° C.

5. The method of removing diphenylamine from smokeless powder, which includes treatment of the powder with isopropyl alcohol with which is admixed about 5% of benzene.

In testimony of which invention, I have hereunto set my hand, at Kenvil, N. J., on this 9th day of July, 1926.

DURAIN C. BUTTS.